United States Patent [19]

Castelli et al.

[11] Patent Number: 5,270,630
[45] Date of Patent: Dec. 14, 1993

[54] METHOD AND APPARATUS FOR ANTIROTATION ENCODER INTERFACES

[75] Inventors: Vittorio Castelli, Yorktown Heights; James M. Casella, Webster; Lloyd Williams, Mahopac; Joannes de Jong, Suffern, all of N.Y.

[73] Assignee: Xerox Corporation, Stamford, Conn.

[21] Appl. No.: 884,095

[22] Filed: May 15, 1992

[51] Int. Cl.⁵ .............................................. G05B 19/29
[52] U.S. Cl. ..................................... 318/602; 318/603; 318/661; 74/63; 310/75 D; 403/396; 403/202; 403/203; 464/171
[58] Field of Search ................. 310/75 D, 90, 81, 82; 324/160–180; 74/12, 63–69, 390; 464/170–172; 318/563, 568.17, 568.18, 602, 603, 618, 652, 661; 403/388, 396, 202, 203

[56] References Cited

U.S. PATENT DOCUMENTS

| | | | |
|---|---|---|---|
| 4,802,458 | 2/1989 | Finsterwald et al. | 128/661.08 |
| 4,922,247 | 5/1990 | Koek | 341/2 |
| 4,963,732 | 10/1990 | Saito | 250/231.13 |
| 5,016,072 | 5/1991 | Greiff | 357/26 |

Primary Examiner—William M. Shoop, Jr.
Assistant Examiner—Brian Sircus
Attorney, Agent, or Firm—Oliff & Berridge

[57] ABSTRACT

An encoder interface for interfacing an encoder having a first part defining a first axis to a structure having a second part defining a second axis substantially parallel to the first axis includes a portion for translating the first part with respect to the second part in a direction transverse to the first axis and a portion for rigidly rotationally stabilizing the first part with respect to the second part against a rotation of the first part about the first axis induced by a translation of the first part with respect to the second part in the direction transverse to the first axis. A method for interfacing an encoder having a first part defining a first axis with a structure having a second part defining a second axis substantially parallel to the first axis includes the steps of translating the first part with respect to the second part in a direction transverse to the first axis and rigidly rotationally stabilizing the first part with respect to the second part against a rotation of the first part about the first axis induced by a translation of the first part with respect to the second part in the direction transverse to the first axis.

8 Claims, 15 Drawing Sheets

METHOD AND APPARATUS FOR ANTIROTATION ENCODER INTERFACES

BACKGROUND OF THE INVENTION

1. Field of the Invention

The present invention relates to the mounting of an encoder for the attainment of measurement accuracy and to the registration of color images in a color image output terminal. More particularly, the invention relates to antirotation encoder interfaces of several mechanisms used for registration of color images.

2. Description of the Related Art

Image registration is an important and difficult problem in a xerographic type color image output terminal. In FIG. 1, a color image output terminal 10 is shown having four photoreceptors 12, 14, 16 and 18. Each photoreceptor carries a unique color separation obtained by a conventional xerographic processor having charge device 20, write device 22 and develop device 24. The four color separations are transferred to intermediate belt 26 so as to coincide with one another and produce a full color image 1. Subsequently, the color image is transferred to paper 6 and the color image is fixed thereon. Photoreceptors 12, 14, 16 and 18 contain rotating members 1, 2, 3 and 4 respectively. Intermediate belt 26 is driven by rotating member 5.

In order to deliver good quality images, strict specifications are imposed on the accuracy with which the color image output terminal 10 superimposes the various color separations which compose the individual images. This juxtaposition accuracy is often called registration. In the trade, a limit of 125 micrometers is considered a maximum for acceptable misregistration errors of quality pictorial color images and a 75 micrometer limit is often imposed as a limit by the manufacturers of top quality equipment. These numbers represent the diameter of a circle which would encompass all supposedly homologous color dots.

In a single pass image output terminal, the various color separations are produced by separate imaging members and are passed to the intermediate belt where they are collected in juxtaposition. Registration errors can arise from motion errors of the collecting device and from mismatch of the individual separations.

With respect to the motion of the collecting device, good registration goals are attainable if the unit is designed such that its kinematic errors are made synchronous with the spacing distance between image transfer points from photoreceptors 12, 14, 16, and 18 to belt 26. In this manner, the modulation of the surface motion is repeatable (synchronous) with the imaging pitch and color on color separation errors are minimized. Although the absolute position error of each color may be large, the relative position error between colors is held to specification. The absolution image distortion is usually tolerable.

With respect to the imaging modules, the distortion created in the color separations contribute to misregistration to the extent that they are mismatched. In tandem image output terminals, where the separations are generated and developed on individual photoreceptors and then transferred to an intermediate belt or to copy paper, a mismatch in the motion errors of the photoreceptors contributes to misregistration. In machine architectures where rotation of the photoreceptor supporting members 1, 2, 3, and 4 and belt drive member 5 are controlled by closed loop servos with feedback from encoders, the run out error of the encoder shaft (eccentricity between the encoder shaft and the roll centers of rotating members 1, 2, 3, 4 and 5) adds to the inherent encoder error and becomes a significant factor. In FIG. 2, motor-encoder pair 30 is shown having a motor 32 including an immovable member 34 and rotating member 36. Motor-encoder pair 30 also has encoder 40 including stator 42 and rotor 44. Rotor 44 is coupled with rotating member 36 through flexible coupler 46. Rotatably immovable member 34 and stator 42 are fixed to frame 38 (also referred to as a ground) so that the rotational axis of member 36 is substantially parallel to the rotational axis of rotor 44. Due to tolerances, these two rotational axes are not coincident therewith.

Flexible couplers such as shown in FIG. 2 enable the motor-encoder pair 30 to be produced at low cost and with relaxed tolerances on manufactured components since flexible coupler 46 yields to small misalignments. Under the influence of exciting torques, the compliance of flexible coupler 46 causes the rotation of rotor 44 to differ from that of rotating member 36 due to inertia of rotor 44. This difference limits the timely response of the encoder to changes in angular position of rotating member 36 and the dynamic mechanical resonance in the motor-encoder pair limits, in general, the performance of the servo control system.

If flexible coupler 46 were to be made of rigid material, the timely response of the motor-encoder pair would be improved; however, misalignments between the axis of rotor 44 and the axis of rotating member 36 would stress and quickly cause the failure of the bearings of either encoder 40 or motor 32. In order to avoid damage to the bearings when flexible coupler 46 is made rigid, it is necessary to provide a flexible mounting for either motor 32 or encoder 40 or both.

One such flexible mounting is shown in FIGS. 3A and 3B, wherein a shaft of motor 52 is rigidly coupled to a shaft of encoder 54 through rigid coupler 53. Antirotation arm 56 is fastened to a stator of encoder 54 by fastening means 58. In FIGS. 3A and 3B, the fastening means 58 is shown to be a pair of screws. The antirotation arm 56 is pinched between frame 62 (ground) and forcing device 64 which is backed by additional ground 66 so that antirotation arm 56 is slidable in a translation direction 68. The encoder shaft center B is in the center of the end view of encoder 54. Because of misalignment between motor 52 and encoder 54, encoder shaft center B rotates in a small circle 70 having a radius e due to the shaft eccentricity of either the encoder shaft or motor shaft or coupling 53. The encoder shaft center B is able to move in the translation direction 68 and in a direction transverse to the translation direction 68, and in the plane of FIG. 3B, due either to siding at the contact of the antirotation arm 56 with frame 62, or to pivoting of the antirotation arm 56 about the contact point with frame 62. In either case, C is the slide center of the antirotation arm, and B is the encoder shaft center defining length L therebetween.

Although the encoder interface shown in FIGS. 3A and 3B rigidly couples a shaft of the encoder 54 to a shaft of the motor 52, the interface causes an undesirable rotation of the housing of the encoder 54 due to eccentricity e between the shafts of the motor and the encoder. This undesired rotation causes errors in the readout of the encoder.

FIG. 4 shows a schematic of this error source. As encoder shaft center B rotates about the small circular orbit 70 having radius e due to the eccentricity between the two shafts, and having a center of encoding 74 the encoder housing 72 rotates by a small angle $\beta$ which varies according to the position of encoder shaft center B along the track of circular orbit 70. Thus, since the encoder produces a signal indicative of the angle of the encoder rotor relative to the encoder stator, the eccentricity of either the encoder shaft 71 or motor shaft causes the indicated angle to differ from to the angle of the motor shaft relative to the machine frame, which is the desired quantity to be measured. When the stator rotates as illustrated in FIG. 4, the encoder signal contains an error caused by the rotation of the encoder housing 72 through angle $\beta$ given by the formula:

$$\beta = \arcsin[(e/L) \sin\theta]$$

where $\theta$ is the input rotation of the encoding shaft which is rigidly coupled to the eccentric motor shaft. Therefore, $\theta$ represents the position of encoder shaft center B along the track of circular orbit 70.

It is seen that even when an encoder interface is rigidly coupled to the rotating member of a motor, where the encoder shaft is free to translate, errors in the encoder signal are produced. For example, with eccentricity e=0.005 inches and L=1.0 inches, the maximum $\beta$ of the encoder housing would be 0.2865 degrees. This error reflected at the surface of a one inch diameter roller would be about 0.005 inches. To minimize $\beta$, L should be large in proportion to the magnitude of the eccentricity e. Since eccentricity e is dependent on the manufacturing costs expended in making the parts, a large eccentricity e corresponding to a low cost part having minimum controls on tolerances, would require a larger antirotation arm length L. There comes a point where the antirotation arm length L is impractically large.

SUMMARY OF THE INVENTION

It is an object of the present invention to overcome the limitations in the prior art. Yet another object of the present invention is to rigidly couple a rotor of an encoder with a rotating member of a machine. Yet another object of the present invention is to couple a rotor of an encoder to a rotating member of a machine with an interface having rotational rigidity and translational flexibility. Yet another object of the present invention is to mount an encoder to a rotationally immovable structure with a mount having rotational rigidity and translational flexibility.

These and other objects are achieved with an encoder interface for interfacing an encoder having a first part defining a first axis to a structure having a second part defining a second axis substantially parallel to the first axis, the encoder interface including means for translating the first part with respect to the second part in a direction transverse to the first axis, and rigid means for rotationally stabilizing the first part with respect to the second part against a rotation of the first part about the first axis induced by a translation of the first part with respect to the second part in the direction transverse to the first axis.

These and other objects are also achieved with an interfacing method including the steps of translating the first part with respect to the second part in a direction transverse to the first axis, and rigidly rotationally stabilizing the first part with respect to the second part against a roration of the first part about the first axis induced by a translation of the first part with respect to the second part in the direction transverse to the first axis.

BRIEF DESCRIPTION OF THE DRAWINGS

The invention will be described in detail in the following description of the preferred embodiments with reference to the following figures, wherein:

FIG. 10 is a view at 90 degrees from the view of FIG. 9;

DETAILED DESCRIPTION OF THE PREFERRED EMBODIMENTS

1. Rigid Cross Embodiment

Figure 5:
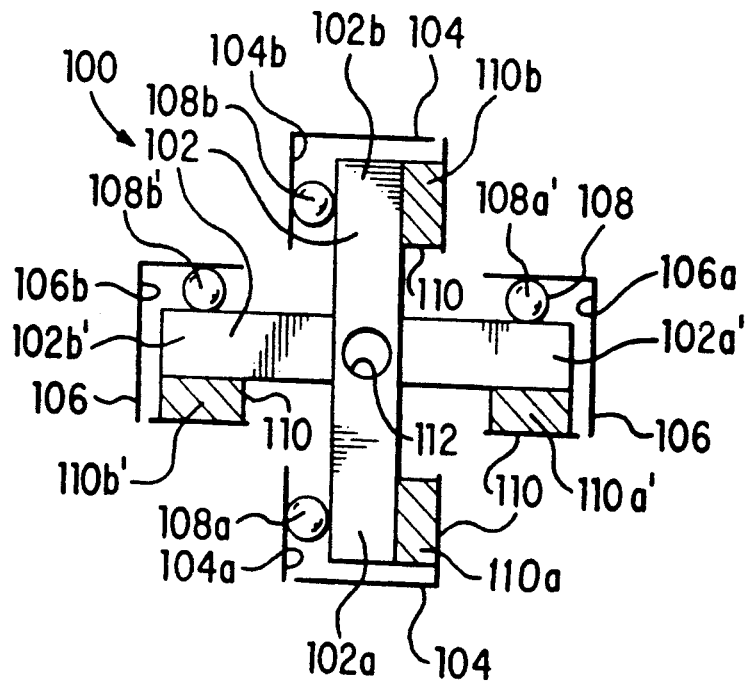
FIG. 5 shows a first version of a rigid cross embodiment of the present invention.
Figure 13:
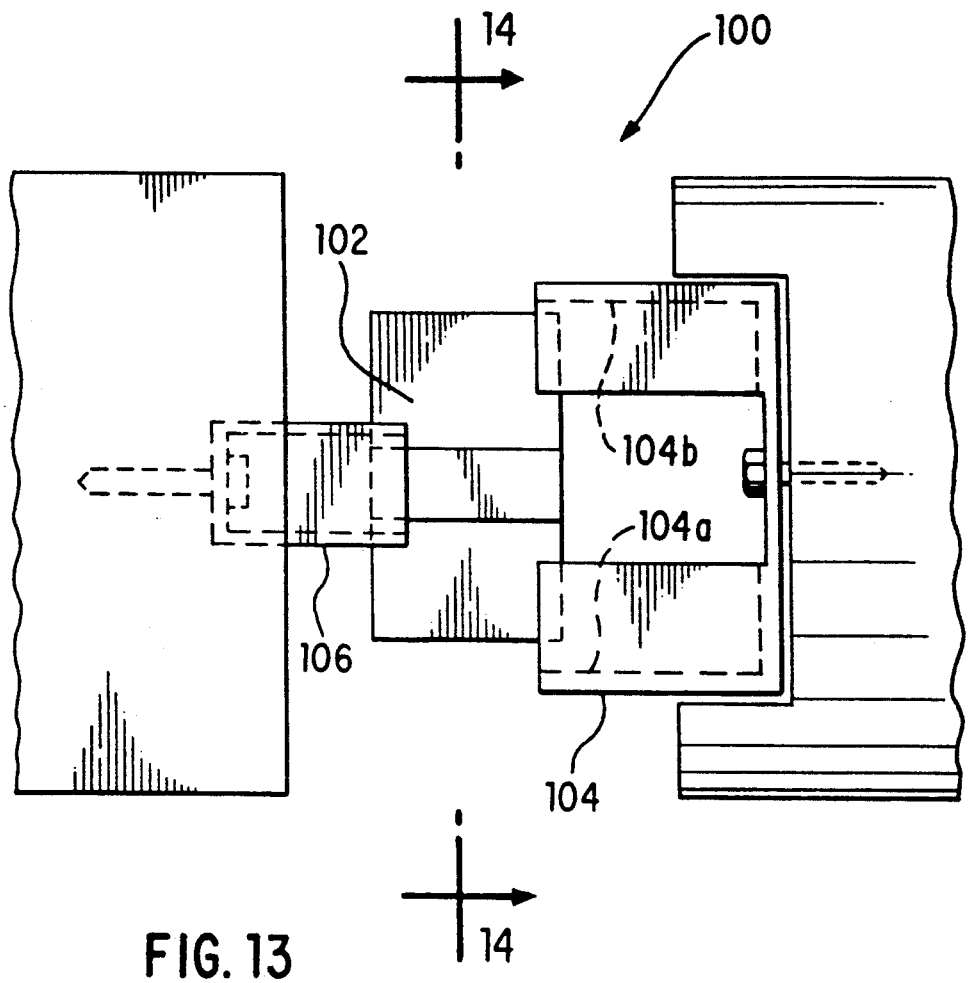
FIG. 13 shows a side view of a rigid cross embodiment of the present invention.
Figure 14:
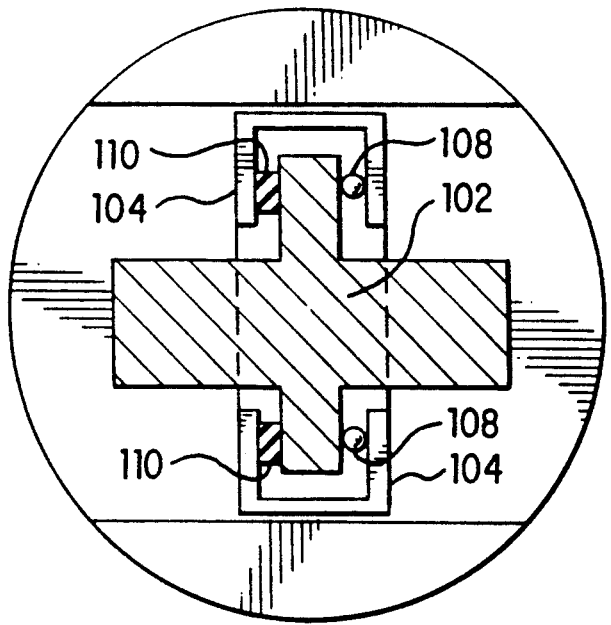
FIG. 14 shows an end section view the embodiment of FIG. 13.

FIG. 5 shows a first version of the rigid cross embodiment of the present invention. The rigid cross interface 100 employs rigid cross 102 to interface first part 104 having channels 104a and 104b with second part 106 having channels 106a and 106b. In a first employment of a rigid cross interface, first part 104 is a stator of the encoder and second part 106 is a rotationally immovable structure such as a motor housing within which a rotating member rotates or a machine frame through which a rotating member passes. Alternatively, first part 104 is a rotor of an encoder and second part 106 is a rotating member of a machine such that the rotating member drives the rotor of the encoder by applying torque through rigid cross 102 (see FIGS. 13 and 14).

Rigid cross 102 is formed in the shape of an X having four ends organized in two pairs of opposite ends, ends 102a and 102b being one pair and ends 102a' and 102b' being the other pair. One pair of ends 102a and 102b rolls or slides on a pair of bearings 108, the pair being 108a and 108b, in a first direction with respect to first part 104 and a second pair of ends 102a' and 102b' rolls or slides on a pair of bearings 108, the pair being 108a' and 108b' in a second direction with respect to second part 106 so that rigid cross 102 is free to slidably translate in both the first and second directions with respect to both first part 104 and second part 106. However, the bearings 108 are arranged so that rigid cross 102 is rotationally resistant to a rotation of second part 106 with respect to first part 104. Therefore, first part 104 may translate with respect to second part 106, but first part 104 is unable to rotate with respect to second part 106.

Bearings 108 may be advantageously formed of dry bearing materials such as graphite disposed in a slidable channel; however, FIG. 5 shows a structure such as a hardpin pressed between a side of a channel and the rigid cross by elastic pads 110. In FIG. 5, a first pair of hardpins 108a and 108b is pressed against a side of a channel of first part 104 by rigid cross 102 under pressure of a first pair of loading mechanisms 110a and 110b of a set of loading mechanisms 110 such as elastic pads. Further, a second pair of hardpins 108a' and 108b' is pressed against a side of a channel of second part 106 by rigid cross 102 under pressure from a second pair of loading mechanisms 110a' and 110b' of the set of loading mechanisms 110 such as elastic pads. Thus, the loading mechanisms 110 press rigid cross 102 into hardpins 108 which are pressed against a side of a channel of first part 104 so as to maintain rigid cross 102 rotationally stiff with respect to first part 104. Similarly, rigid cross 102 is maintained rotationally stiff with respect to second part 106 so that first part 104 and second part 106 are rotationally stiff with respect to each other while being translationally flexible with respect to each other.

In operation, when first part 104 is a stator of an encoder, and second part 106 is a rotationally immovable structure, in particular a motor housing or a machine frame, then rigid cross 102 is advantageously provided with aperture 112 through which a rotor shaft of the encoder or a shaft of the motor or a rotating member passes. Further, a rigid coupler connecting the rotor shaft of the encoder to the shaft of the motor may also advantageously pass through aperture 112.

Figure 6B:
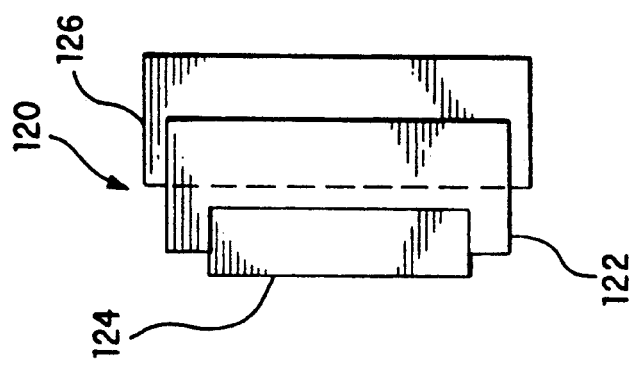
FIGS. 6A and 6B show a second version of the rigid cross embodiment of the present invention.
Figure 6A:
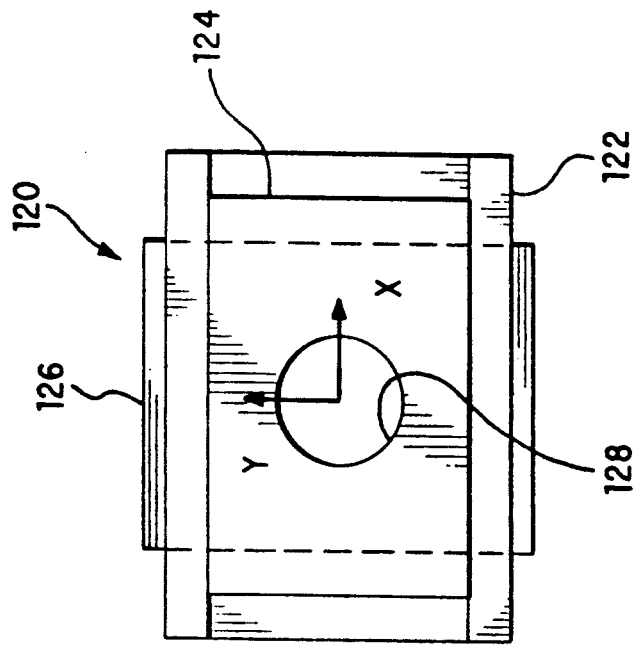

FIGS. 6A and 6B show a second version of the rigid cross embodiment. In FIGS. 6, 6A and 6B slide interface 120 includes slide 122, slidable with respect to first part 124 in a first direction and slidable with respect to second part 126 in a second direction. In particular, slide 122 is slidable with respect to first part 124 in an X direction, and slide 122 is slidable with respect to second part 126 in a Y direction. It will be appreciated that slide 122 is formed so that, either the sliding occurs between close fitting bodies to obviate a need for a loading mechanism, or the sliding occurs between pairs of surfaces which are preloaded into contact.

As in the first version of the rigid cross embodiment described with respect to FIG. 5, the present version of the rigid cross embodiment described with reference to FIGS. 6 6A and 6B may advantageously be provided with aperture 128 through which a rotor shaft of an encoder or a shaft of a motor or a rigid coupler may pass. In a first employment of the rigid cross embodiment described with reference to FIGS. 6A and 6B, first part 124 is a stator of an encoder and second part 126 is a rotationally immovable structure such as either a housing of a motor through which a motor shaft passes or a frame of a machine through which a rotating member passes. Alternatively, in a second employment, first part 124 advantageously is a rotor of an encoder and second part 126 is a rotating member of a machine.

The operation of the rigid cross embodiment described with reference to FIGS. 6A and 6B will be understood by persons of ordinary skill in the art from the above discussion with respect to the operation of the rigid cross embodiment described with reference to FIG. 5.

2. Bellows Embodiment

Figure 7:
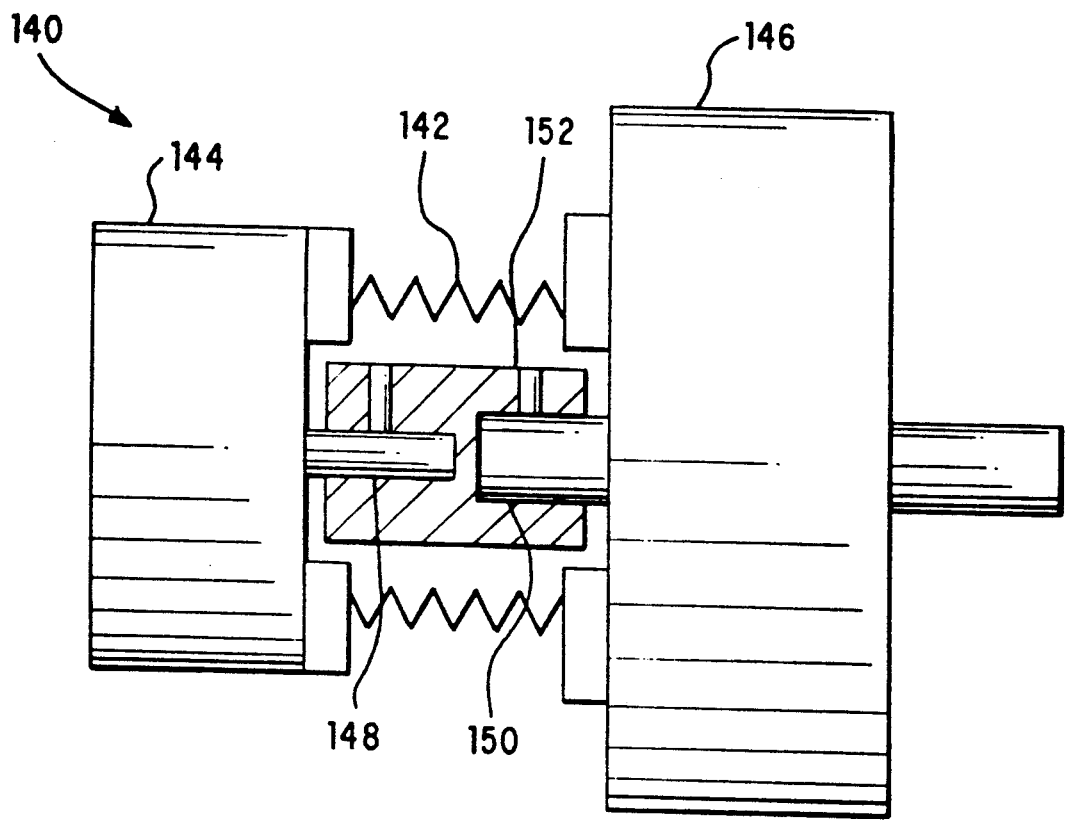
FIG. 7 shows a bellows embodiment of the present invention.

FIG. 7 shows a bellows embodiment of the present invention. In FIG. 7, bellows interface 140 includes bellows 142 connected between first part 144 and second part 146. Bellows interface 140 does not include rigid coupler 152 coupling rotor shaft 148 of an encoder with rotating member 150 of a machine. Rigid coupler 152 stiffly couples rotor shaft 148 to rotating member 150. Therefore, in order to assure high reliability of the bearings of first part 144 and second part 146, it is necessary to permit first part 144 to translate with respect to second part 146 so as to compensate for any relative eccentricity in the rotor shaft 148 with respect to rotating member 150, and further to rigidly rotationally interface first part 144 with respect to second part 146 so that the encoder will indicate a correct rotational position of rotating member 150. The rotational symmetry of the bellows assures that no rotation occurs as a result of lateral translation of member 144. The dimensions of bellows 142 are designed so that lateral compliance achieved will not overload bearings of the encoder or motor under the action of the eccentricity in the coupling of shaft 148 and rotating member 150, and at the same time, provide sufficient torsional rigidity to resist disturbance torques.

It will be appreciated by persons of ordinary skill in the art that a coupler between rotor shaft 148 and rotating member 150 formed of a bellow structures is conventionally known. However, such a coupler is limited to diameters approximately corresponding to the diameters of rotor shaft 148 or rotating member 150. Such a coupler diameter limits the rotational stiffness of the coupler. It will be appreciated that the relatively larger bellows 142 of the present invention interfacing the first part 144 with the second part 146 forms a larger bellows so as to be rotationally rigid and translationally flexible. The bellows of the present invention is preferably formed of metal, plastic or rubber materials.

3. Double Flexure Mount Embodiment

Figure 8:
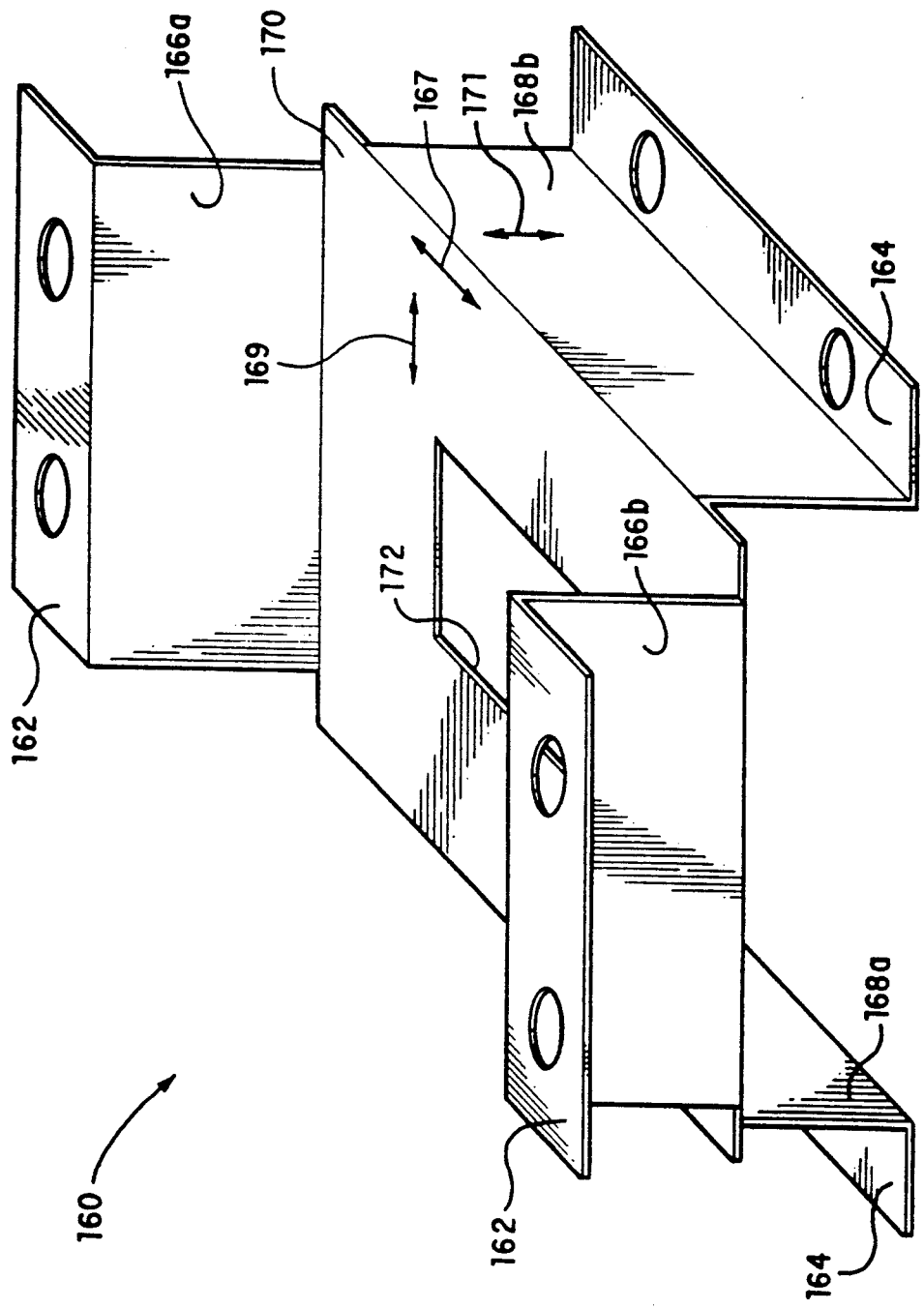
FIG. 8 shows a double flexure mount embodiment of the present invention.

FIG. 8 shows a double flexure mount embodiment of the present invention. In FIG. 8, double flexure mount interface 160 includes flexure backing 170, first flexure sides 166 attached to flexure backing 170, first part mounting surface 162 attached to first flexure sides 166, second flexure sides 168 attached to flexure backing 170 and second part mounting surface 164 attached to second flexure sides 168. First part mounting surfaces 162, or their equivalent, are fixedly attached to a first part, not shown in FIG. 8. First part mounting surfaces 162, first flexure sides 166 and flexure backing 170 are formed from flexible material such as metal or plastic so as to enable flexure backing 170 to translate in a first direction 167 with respect to the first part. A width of first flexure sides 166 in a second direction 169 provides sufficient structural rigidity so that flexure backing 170 does not translate in second direction 169 with respect to the first part.

In a similar manner, second part mounting surfaces 164 are fixedly attached to a second part, not shown in FIG. 8. Second part mounting surfaces 164, second flexure sides 168 and flexure backing 170 form a flexible structure that permits flexure backing 170 to translate in second direction 169 with respect to the second part. A width of second flexure sides 168 in first direction 167 provides sufficient structural rigidity so that flexure backing 170 does not translate in first direction 167 with respect to the second part.

Flexure backing 170 may translate in first direction 167 with respect to the first part while flexure backing 170 may translate in second direction 169 with respect to the second part. Therefore, the first part may flexibly translate with respect to the second part in both the first direction 167 and the second direction 169.

When the first part is rotated about an axis extending through a center of flexure backing 170 in a third direction 171, a force is applied to first flexure side 166a where it is attached to a corresponding one of first part mounting surfaces 162 in a direction parallel with second direction 169, and at the same time, an opposing force is applied to first flexure side 166b where it attaches to another of first part mounting surfaces 162 in a direction antiparallel to the force applied to first flexure side 166a. Because of the width of first flexure sides 166 in second direction 169 and a dimension of first flexure sides 166 in third direction 171, the antiparallel forces applied to first flexure sides 166 where they attach to first part mounting surfaces 162 is transferred to flexure backing 170 where it attaches to first flexure sides 166. Because of the widths of flexure backing 170 in both the first direction 167 and the second direction 169, the antiparallel forces applied to flexure backing 170 where it attaches to first flexure sides 166 is transferred as antiparallel forces applied to second flexure sides 168 where they attach to flexure backing 170. Because of the width of second flexure sides 168 in first direction 167 and a dimension of second flexure sides 168 in third direction 171, antiparallel forces applied to second flexure sides 168 where they attach to flexure backing 170 are transferred to second part mounting surfaces 164 where they are attached to second flexure sides 168. Thus, a rotation of the first part about an axis extending centrally through flexure backing 170 in third direction 171 is transferred directly to the second part since the second part is fixedly attached to second part mounting surfaces 164. Therefore, the first part may flexibly translate in first direction 167 and in second direction 169 with respect to the second part while being rigidly coupled to transfer torque about an axis extending through a central area of flexure backing 170 in a third direction 171.

As in other embodiments of the present invention, the double flexure mount interface 160 may be employed to interface a stator of an encoder as a first part with a rotationally immovable structure as a second part. For example, the rotationally immovable structure may be a motor housing or a frame of a machine through which a rotating member extends. As in other embodiments of the present invention, the double flexure mounting interface 160 has aperture 172 in flexure backing 170 to provide a passage through which the rotating member and a rotor shaft of the encoder may be rigidly coupled.

Figure 9:
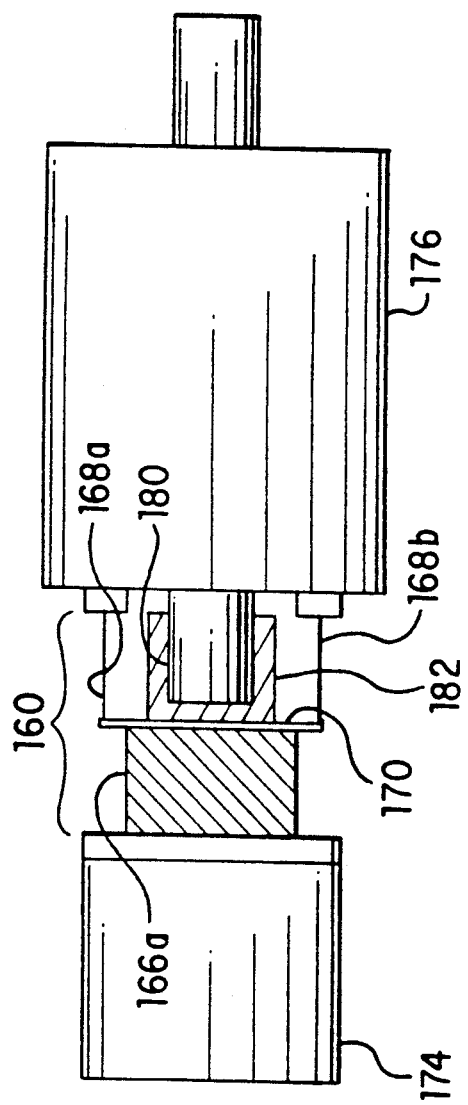
FIGS. 9 and 10 show the double flexure mount embodiment of the present invention employed to interface a first part with a second part where
Figure 10:
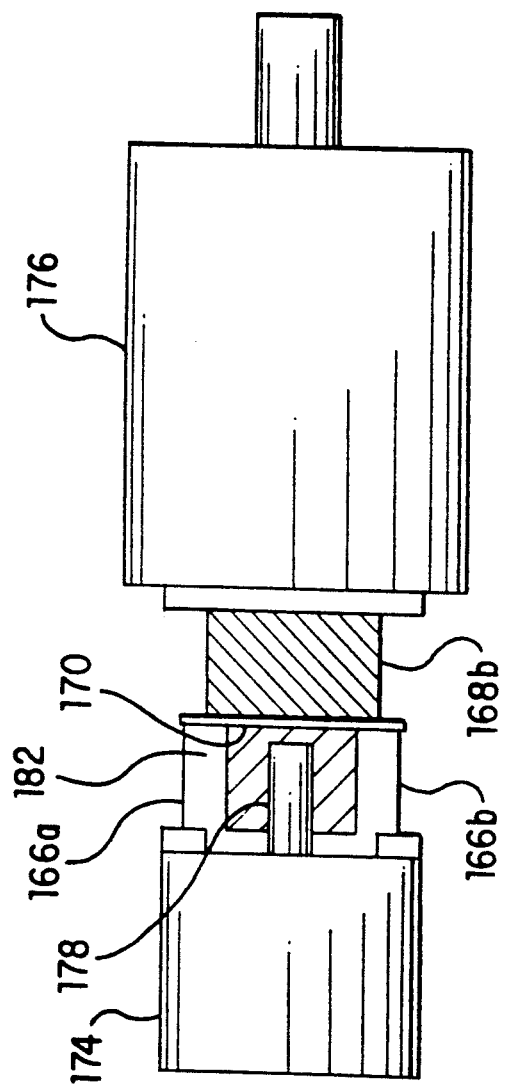

FIG. 9 shows first part 174 as a stator of an encoder, second part 176 as a housing of a motor and double flexure mount interface 160 interfacing therebetween. Although not part of double flexure mount interface 160, FIG. 9 also shows rotating member 180 coupled through rigid coupling 182 to rotor shaft 178 (not shown in FIG. 9 but shown in FIG. 10). FIG. 9 shows rigid coupling 182 passing through the aperture of flexure backing 170, first flexure side 166a shown broadside and second flexures sides 168a and 168b shown edgewise. FIG. 10 shows the same motor-encoder pair from a view orthagonal to the view of FIG. 9. FIG. 10 shows first flexure sides 166a and 166b shown edgewise and second flexure sides 168b shown broadside. Also shown is rotor shaft 178 driven by rigid coupling 182 which passes through the aperture of flexure backing 170.

Figure 15:
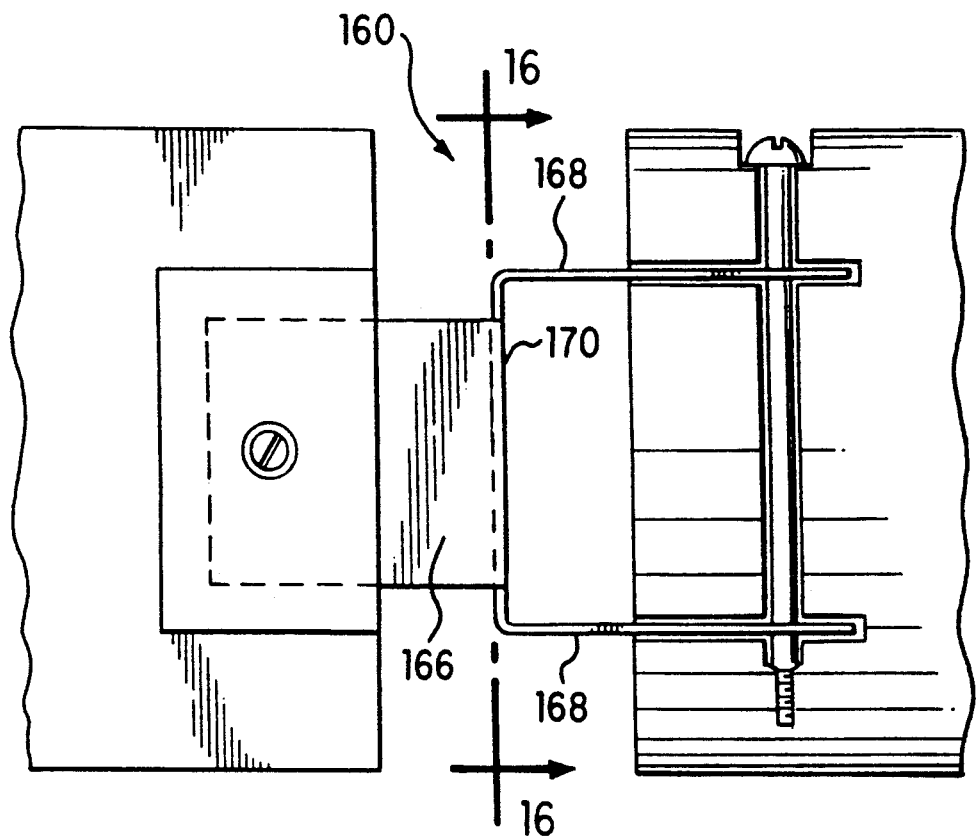
FIG. 15 shows a side view of a double flexure embodiment of the present invention.
Figure 16:
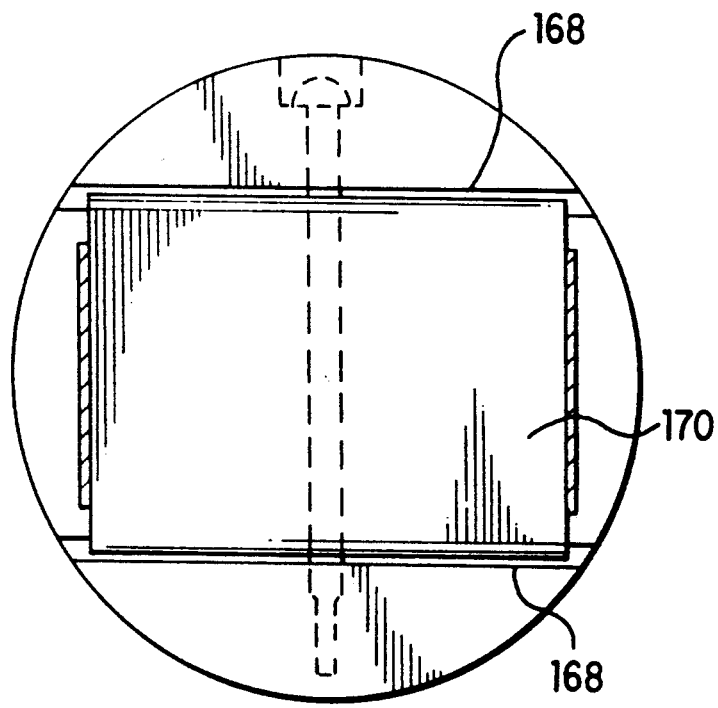
FIG. 16 shows an end section view of the embodiment of FIG. 15.

In an alternate employment of the double flexure mount interface 160 shown in FIG. 8, the first part is a rotor shaft of an encoder and the second part is a rotating member of a machine such as the rotating shaft of a motor (see FIGS. 15 and 16). In such an employment, double flexure mount interface 160 permits the rotating member to be coupled to the rotor shaft so as to be rotationally rigid and translationally flexible.

In both employments, the double flexure mount interface 160 permits translation of the first part with respect to the second part without causing a rotation of the first part with respect to the second part. If the expected misalignment is large, practical designs must employ materials chosen to counteract fatigue. Relative dimensions are chosen to achieve proper lateral compliance so as to not overload the bearing of the encoder or motor while providing torsional rigidity necessary in order to resist disturbance torques. It will be appreciated by persons of ordinary skill in this art that the double flexure mount interface 160 is simple to manufacture and install to provide the interface with high torsional rigidity and translational flexibility.

4. Single Flexure Mount Embodiment

Figure 11:
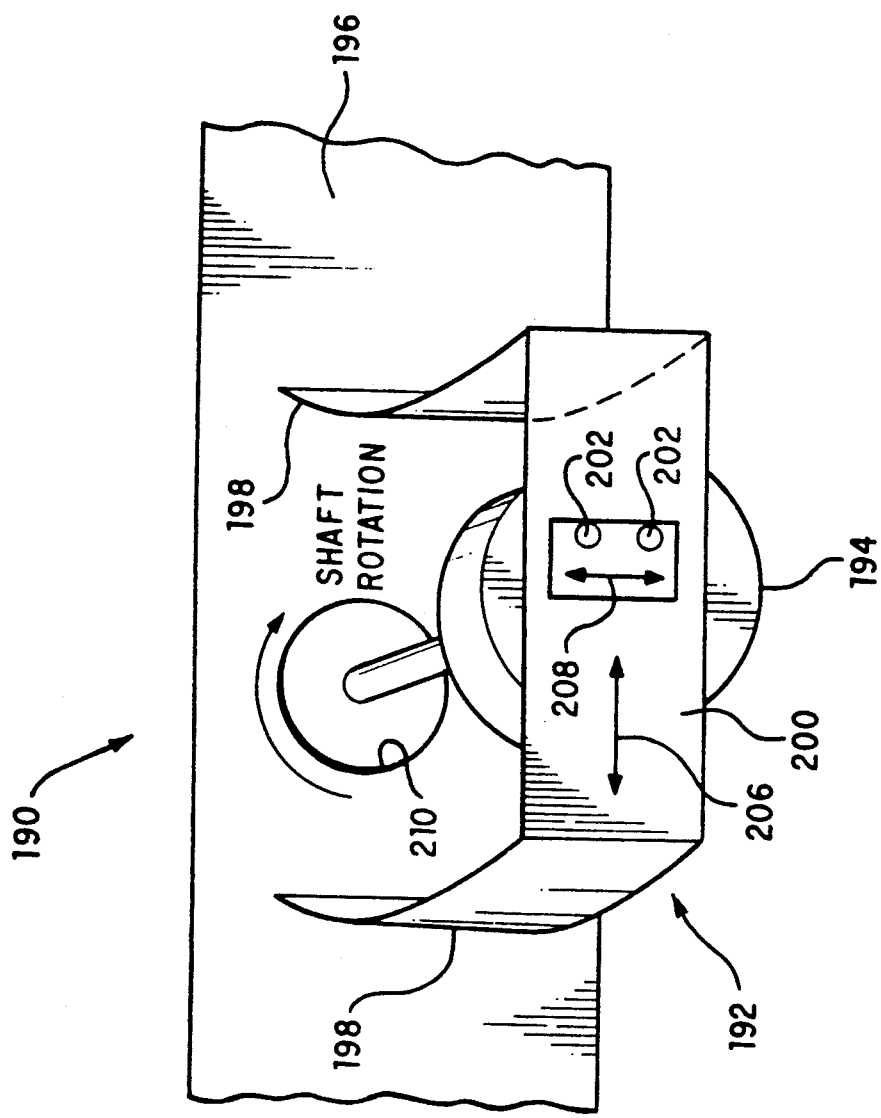
FIG. 11 shows a single flexure mount embodiment of the present invention.

FIG. 11 shows a single flexure mount embodiment of the present invention. In FIG. 11, single flexure mount interface 190 includes flexible mount 192 comprising flexure sides 198 and flexure backing 200. In FIG. 11, the first part 194 is interfaced with second part 196. Flexure backing 200 is able to translate in flexure direction 206 by flexing flexure sides 198 in a manner similar to the manner in which either the first or second flexure sides flex in the embodiment described with reference to FIG. 8. Further, flexure backing 200 is inhibited from translating in transverse direction 208 for the reasons described in this discussion in the embodiment described with reference to FIG. 8.

Since it is necessary for first part 194 to be able to translate in transverse direction 208 with respect to second part 196, slot 204 is provided in flexure backing 200 so that a plurality of pins 202 (or tabs) attached to first part 194 are disposed to pass through slot 204 so as to be slidable in the transverse direction 208.

Therefore, first part 194 is free to translate in the transverse direction 208 with respect to second part 196 by the transverse slide means typically represented by sliding pins 202 within slot 204 in the transverse direction 208. It will be appreciated by persons skilled in this art that the transverse slide means may be provided by other known slidable mechanisms. In addition, first part 194 is free to translate in flexure direction 206 with respect to second part 196 by means of the flexible mount 192. Thus, first part 194 may be freely translated to better align a shaft rotation of first part 194 with a rotating member of a machine.

In a first employment of the single flexure mount interface 190, first part 194 is a stator of an encoder and second part 196 is a rotationally immovable structure such as a motor housing or a frame of a machine having a rotating member. Aperture 210 is advantageously provided in the frame of the machine to permit the shaft rotation of the encoder to be directly and rigidly coupled to the rotating member.

Figure 17:
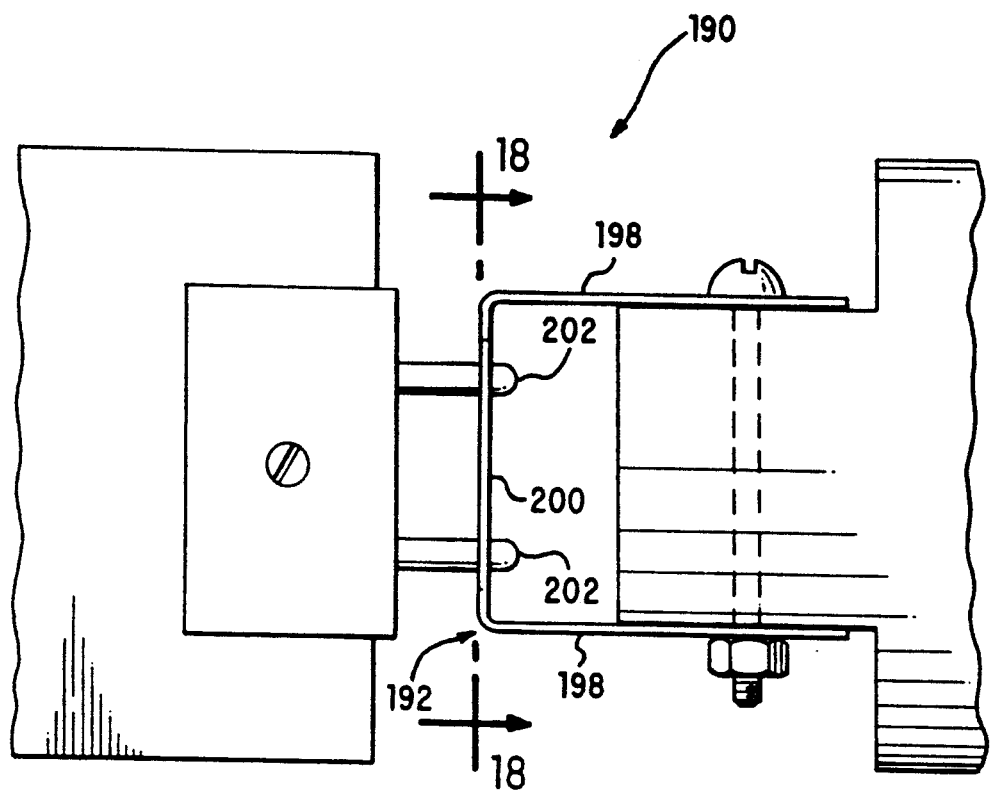
FIG. 17 shows a side view of a single flexure embodiment of the present invention.
Figure 18:
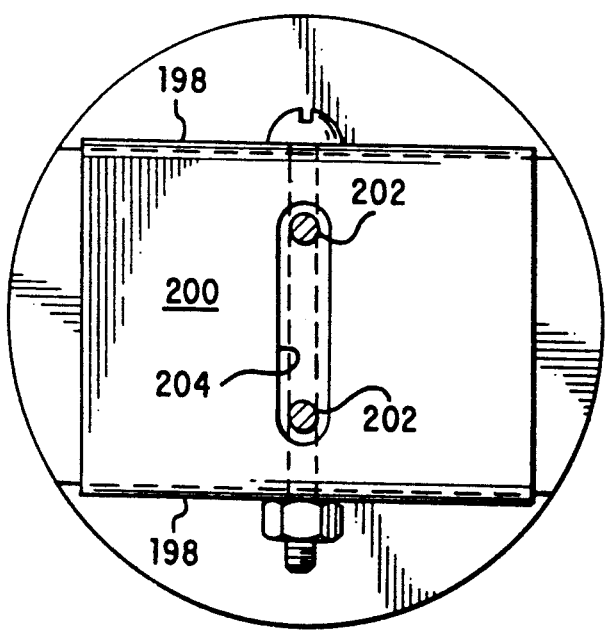
FIG. 18 shows an end section view of the embodiment of FIG. 17.

In an alternative employment of the single flexure mount interface 190, first part 194 is a rotor of an encoder and second part 196 is a rotating member of a machine or a rotating shaft of a motor-motor (see FIGS. 17 and 18).

Figure 1:
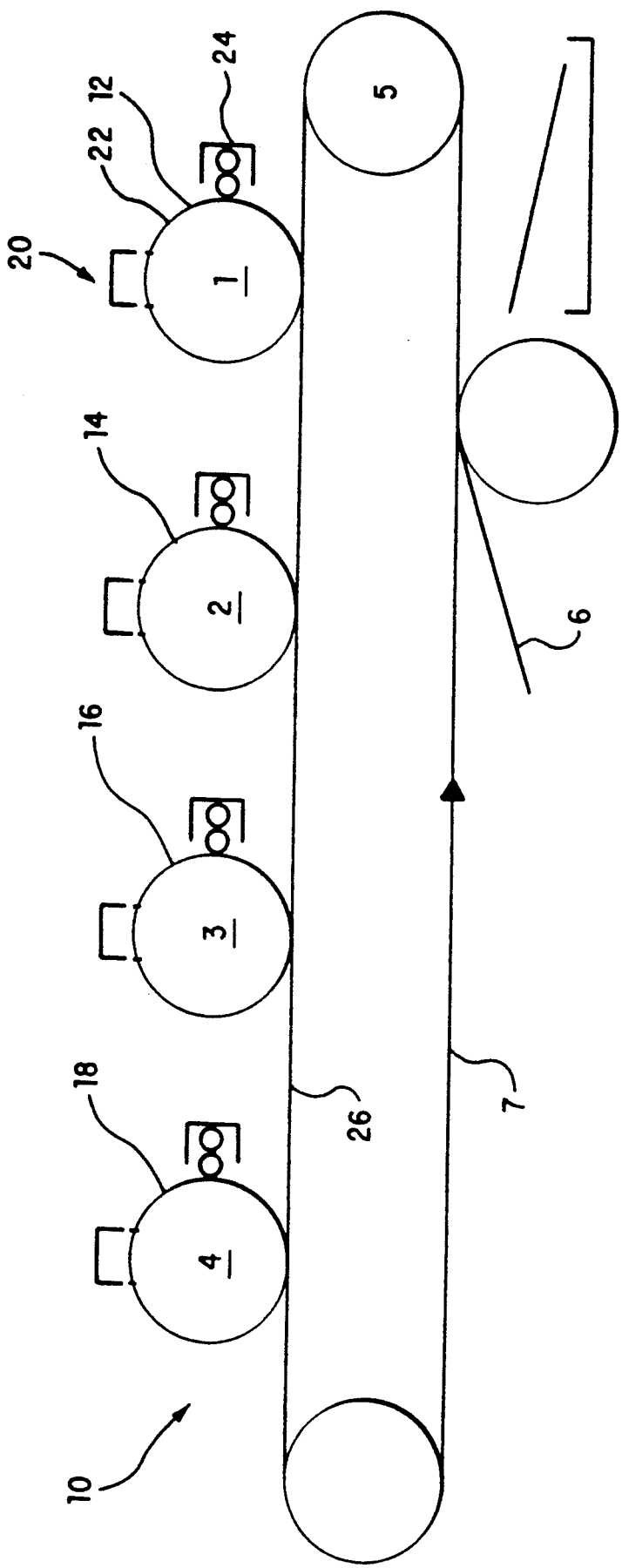
FIG. 1 is a schematic diagram of a four color image output terminal.
Figure 2:
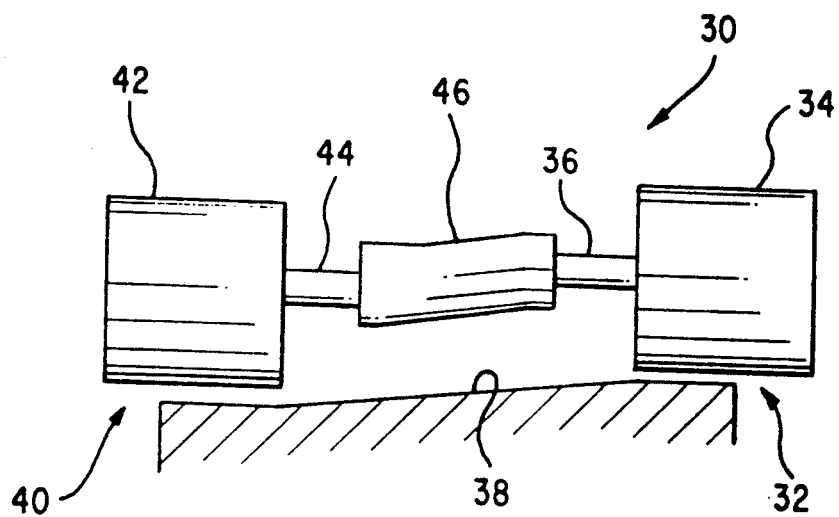
FIG. 2 shows a conventional method for coupling an encoder to a motor using a flexible coupler.
Figure 3A:
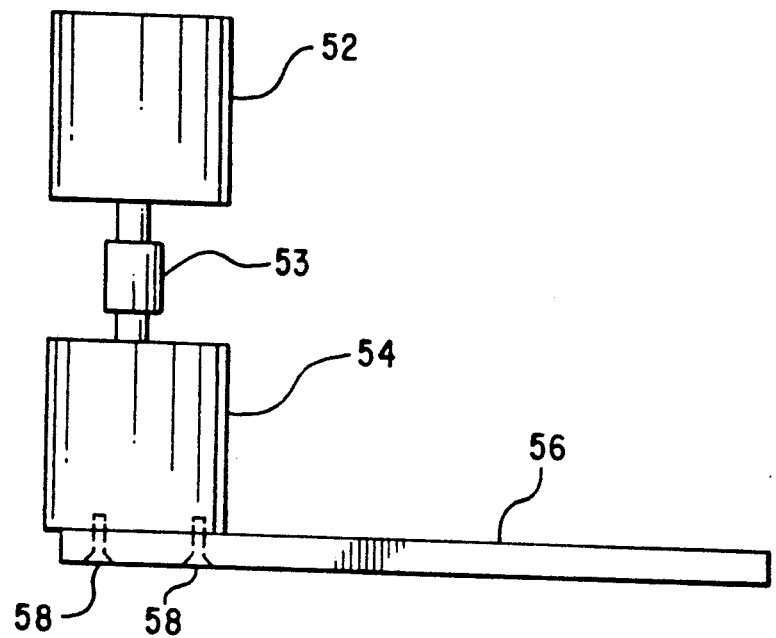
FIGS. 3A and 3B show a conventional method for coupling an encoder to a motor using a rigid coupler.
Figure 3B:
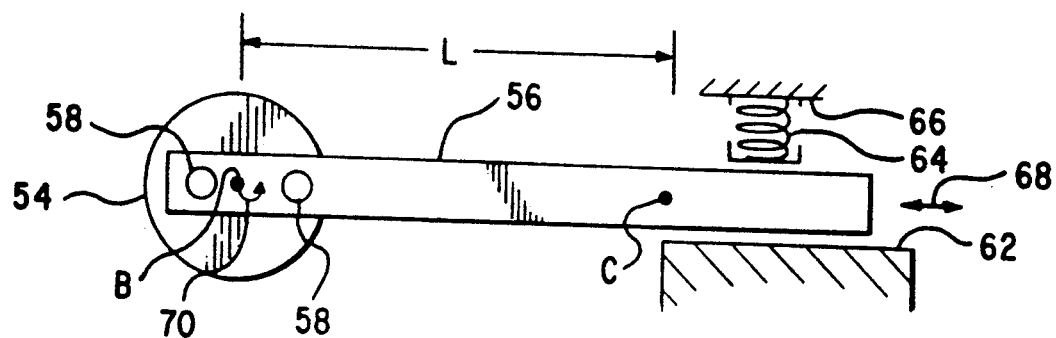
Figure 4:
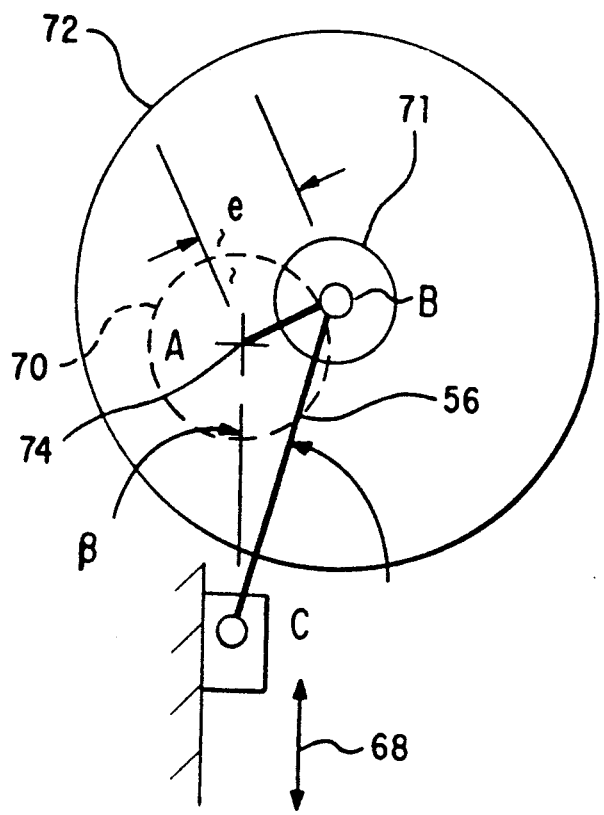
FIG. 4 is a schematic showing the relation of rotational errors to the eccentricity of encoder and motor shafts.
Figure 12A:
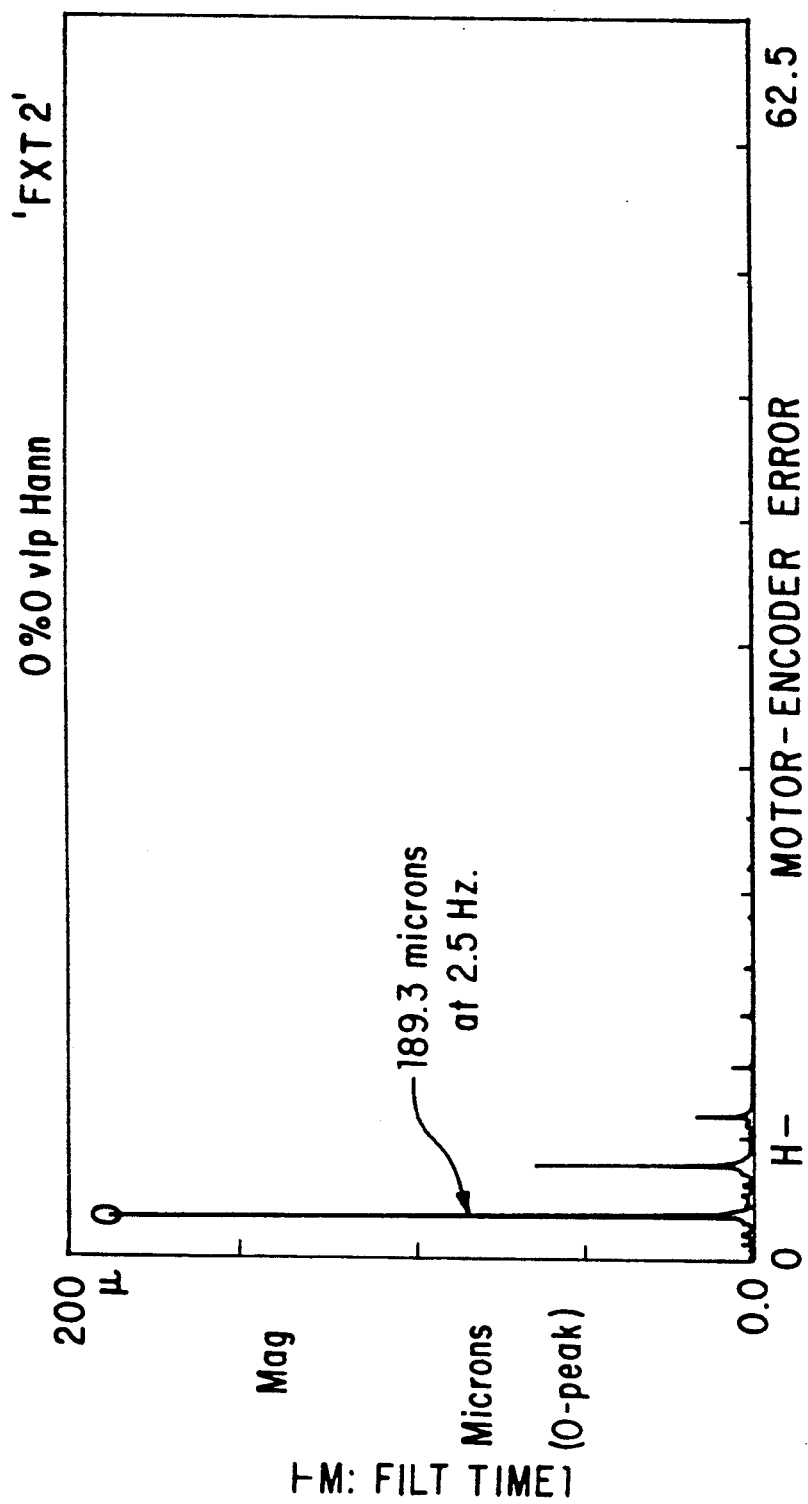
FIGS. 12A and 12B show performance of the conventional interface shown in FIG. 3 and performance of the interface of the present invention shown in FIG. 11, respectively.
Figure 12B:
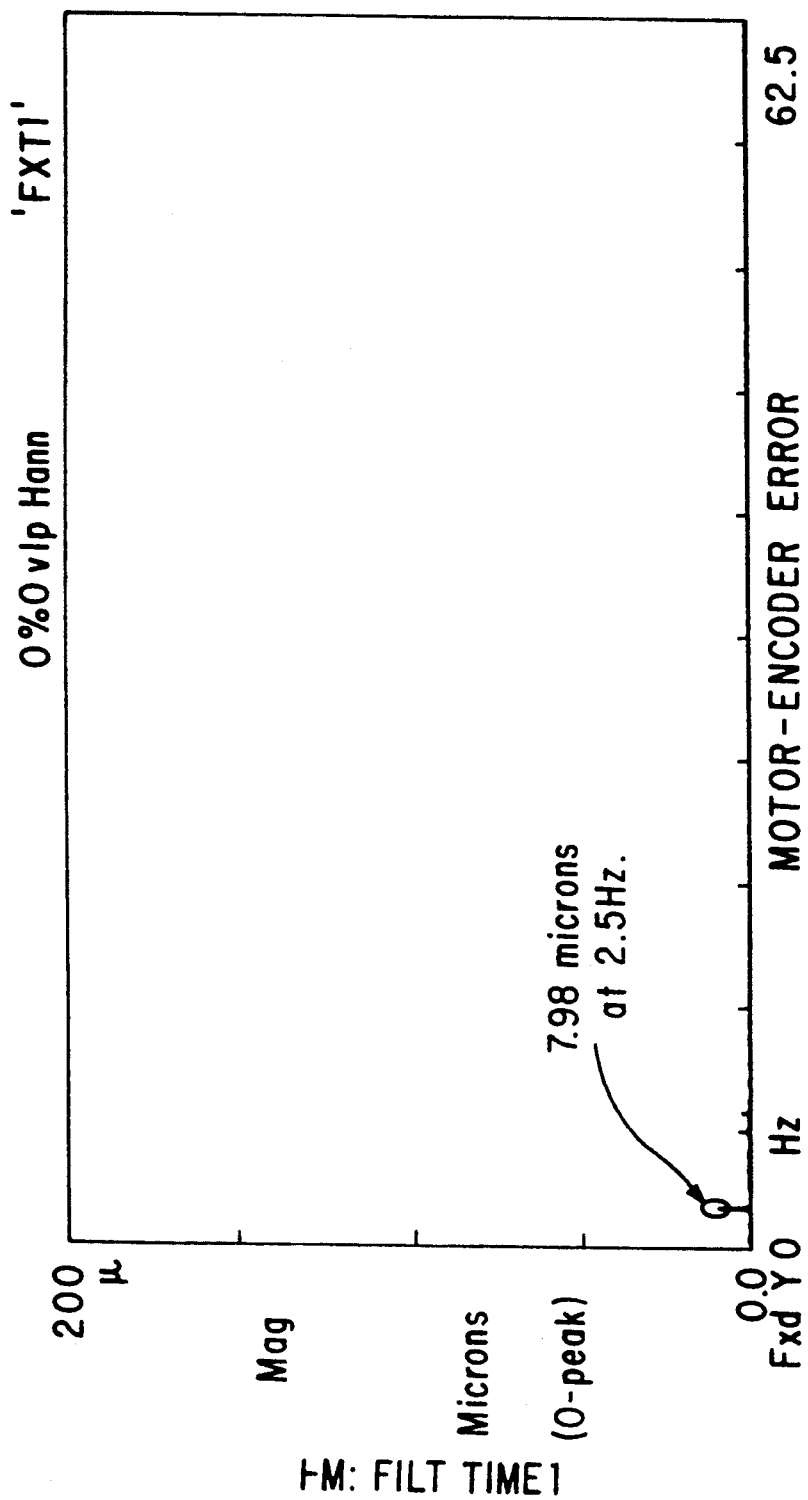

The antirotation flexible mount has been tested, wherein, the first part 194 was a stator of an encoder and the second part 196 was a photoreceptor frame containing a rotating member rigidly coupled to a rotor shaft or the encoder. FIG. 12A shows a magnitude of an image alignment error to be 189.3 microns at a 2.5 Hz dynamic resonance when the coupling eccentricity is 0.020 inches when using the conventional antirotation arm structures of FIGS. 3A and 3B. FIG. 12B shows the same error to be only 7.98 microns at the same 2.5 Hz dynamic resonance with the same coupling eccentricity using the single flexure mount interface of the present invention. Therefore, the present invention provides an improvement in alignment capability between a shaft of an encoder and a rotating member of more than an order of magnitude.

The invention has been described with reference to its preferred embodiments which are intended to be illustrative and not limiting. Various changes may be made without departing from the spirit and scope of the invention as defined in the following claims.

What is claimed is:

1. An encoder interface for interfacing an encoder having a stator to a rotationally immovable structure, the stator defining a first axis and the rotationally immovable structure defining a second axis normal to the rotationally immovable structure and parallel to the first axis, the encoder interface comprising:
   a double flexure mount having first and second portions;
   the first portion of the double flexure mount comprising means for allowing the stator to be translated with respect to the rotationally immovable structure in a direction transverse to the first axis; and
   the second portion of the double flexure comprising rigid means for rigidly rotationally stabilizing the stator with respect to the rotationally immovable structure against a rotation of the stator about the first axis induced by translational movement of the stator with respect to the rotationally immovable structure in the direction transverse to the first axis.

2. The encoder interface of claim 1, wherein:
   the second portion of the double flexure mount includes a square flexure backing disposed substantially perpendicularly to the first axis, the flexure backing having four edges;
   the first portion of the double flexure mount includes a first flexure side and a second flexure side hingedly connected to respective first and second edges of said four edges so that the first and second flexure sides extend toward the stator; and
   the first portion of the double flexure mount further includes a third flexure side and a fourth flexure side hingedly connected to respective third and fourth edges of said four edges so that the third and fourth flexure sides extend toward the rotationally immovable structure, the third and fourth edges being opposite edges of said four edges.

3. The encoder interface of claim 2, further comprising first means for attaching the first and second flexure sides to the stator and second means for attaching the third and fourth flexure sides to the rotationally immovable structure.

4. An encoder interface for interfacing an encoder having a rotor to a structure having a rotating member, the rotor defining a first axis and the rotating member defining a second axis parallel to the first axis, the encoder interface comprising:
   a double flexure mount having two portions;
   one portion of the double flexure mount comprising means for allowing the rotor to be translated with respect to the rotating member in a direction transverse to the first axis; and
   another portion of the double flexure mount comprising rigid means for rigidly rotationally stabilizing the rotor with respect to the rotating member, the double flexure mount rigidly rotationally coupling the rotor to the rotating member.

5. The encoder interface of claim 4, wherein:
   the second portion of the double flexure mount includes a square flexure backing disposed substantially perpendicularly to the first axis, the flexure backing having four edges;
   the first portion of the double flexure mount includes a first flexure side and a second flexure side hingedly connected to respective first and second edges of said four edges so that the first and second flexure sides extend toward the rotor; and
   the first portion of the double flexure mount further includes a third flexure side and a fourth flexure side hingedly connected to respective third and fourth edges of said four edges so that the third and fourth flexure sides extend toward the rotating member, the third and fourth edges being opposite edges of said four edges.

6. The encoder interface of claim 5, further comprising first means for attaching the first and second flexure sides to the rotor and second means for attaching the third and fourth flexure sides to the rotating member.

7. An interface method for interfacing an encoder having a stator defining a first axis and a rotationally immovable structure defining a second axis normal to the rotationally immovable structure and parallel to the first axis, the method comprising the steps of:
   allowing the stator to be translated with respect to the rotationally immovable structure in a direction transverse to the first axis, the step of allowing permitting the stator to be translated with respect to the rotationally immovable structure using one portion of a double flexure mount; and
   rigidly rotationally stabilizing the stator with respect to the rotationally immovable structure against a rotation of the stator about the first axis induced by a translation of the stator with respect to the rotationally immovable structure in the direction transverse to the first axis, the step of rigidly rotationally stabilizing rotationally resisting the rotation of the stator with respect to the rotationally immovable structure using another portion of the double flexure mount.

8. An interface method for interfacing an encoder having a rotor defining a first axis and a structure having a rotating member defining a second axis parallel to the first axis, the method comprising the steps of:

translating the rotor with respect to the rotating member in a direction transverse to the first axis using one portion of a double flexure mount; and rigidly rotationally stabilizing the rotor with respect to the rotating member, to resist the rotation of the rotor with respect to the rotating member using another portion of the double flexure mount, the double flexure mount rotationally coupling the rotor to the rotating member.

* * * * *